No. 613,115. Patented Oct. 25, 1898.
T. BRENNAN & E. CHRISTMAN.
SHOE FOR GRAIN DRILLS.
(Application filed Aug. 30, 1897.)
(No Model.)
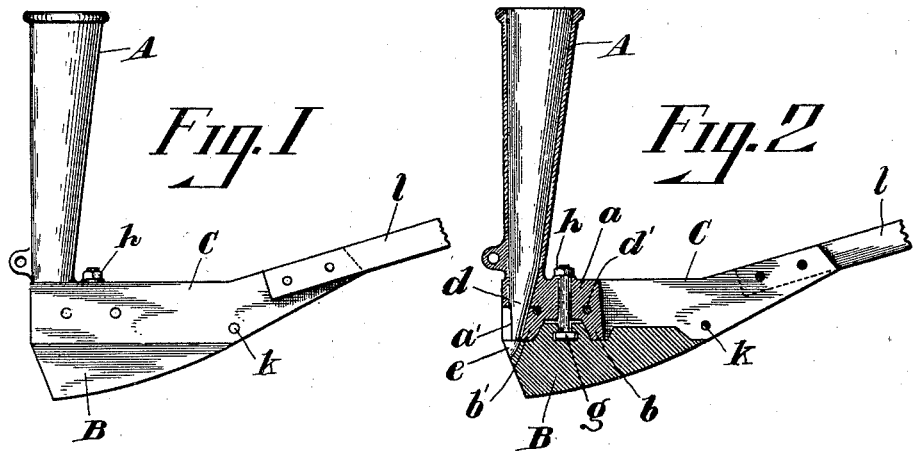
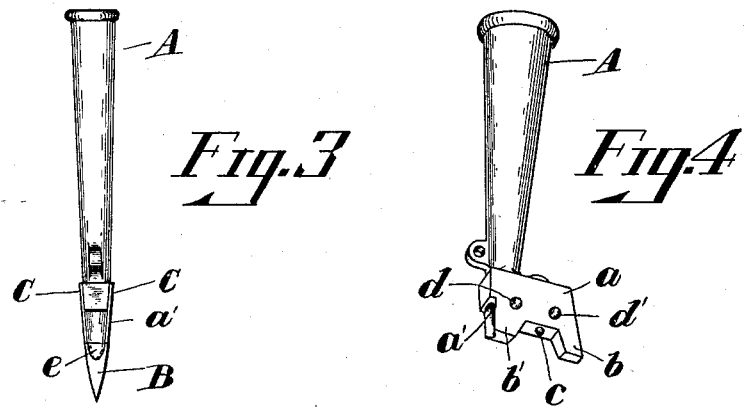
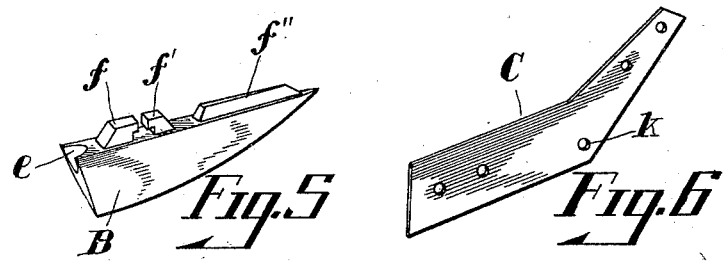
WITNESSES
Sherwood R. Taylor
J. G. Edwards
INVENTORS
Thomas Brennan
Edward Christman
By Arthur Stem
Their Attorney

UNITED STATES PATENT OFFICE.

THOMAS BRENNAN AND EDWARD CHRISTMAN, OF LOUISVILLE, KENTUCKY, ASSIGNORS TO THE BRENNAN & CO. SOUTHWESTERN AGRICULTURAL WORKS, OF SAME PLACE.

SHOE FOR GRAIN-DRILLS.

SPECIFICATION forming part of Letters Patent No. 613,115, dated October 25, 1898.

Application filed August 30, 1897. Serial No. 649,939. (No model.)

*To all whom it may concern:*

Be it known that we, THOMAS BRENNAN and EDWARD CHRISTMAN, citizens of the United States, residing at Louisville, in the county of Jefferson and State of Kentucky, have invented certain new and useful Improvements in Shoes for Grain-Drills, of which the following is a full, clear, and exact description, reference being had to the accompanying drawings, forming part of this specification.

The invention relates to an improvement in shoes for grain-drills, and has for its object the provision of a removable runner or cutter which can be readily detached for purposes of sharpening, replacement, or repairs of any kind. In use the lower rear edge or runner portion of the shoe enters the ground, and consequently is subjected to all wear and injury by reason of the constant rubbing or friction of the soil and its frequent contact with hard objects, such as stone and the like, and is the part requiring the greatest attention.

The object of the improvement is to produce a shoe with a readily-detachable runner to permit of repair or replacement and at the same time enable its quick adjustment and produce a firm and rigidly-connected shoe which cannot work loose and become disconnected by usage, as will be more fully hereinafter described.

In the drawings, Figure 1 is a side elevation of a drill-shoe embodying the invention. Fig. 2 is a vertical longitudinal sectional view of the same. Fig. 3 is a rear elevation of same, showing the seed-discharge opening. Fig. 4 is a perspective view of the seed-tube. Fig. 5 is a perspective view of the runner of the shoe. Fig. 6 is a perspective view of one of the side plates or brace portion of the drill-shoe.

Like letters of reference indicate identical parts in all the figures.

A is a seed-tube, which is usually made with a contracting orifice for conducting the seed to the furrow or cut made by the runner of the shoe.

At the lower end of the seed-tube A it is formed with a forwardly-protruding extension or foot $a$, which is preferably made with its opposite faces or sides converging toward the lower and front edges thereof. The seed-conducting orifice of the tube terminates at the rear end of the foot $a$, forming the discharge-opening $a'$. This extension or foot $a$ is provided with tenons $b\ b'$, between which and extending upwardly through the foot $a$ is a hole $c$. The foot $a$ is provided with small screw or bolt holes $d\ d'$, extending laterally through the same.

B is the cutter or runner portion of the shoe, with a lower curved edge sloping upwardly at the forward point of the same, thus having its deepest cutting-point at the rear, slightly forward of and below the discharge-opening $a'$. At the upper rear edge this cutter or runner portion is formed with a cut or scooped-out portion $e$ to conform with and extend to the discharge-opening $a'$.

The lower rear cutting edge of the runner B terminates, preferably, slightly forward of the upper rear edge thereof, as plainly seen in the drawings.

On the upper side of the runner B are formed tenons $f$, $f'$, and $f''$, which are preferably set within the side edges of the runner B—that is, they are not of the same width as the upper side of the runner B—thus leaving a shoulder on the sides of the tenons $f$, $f'$, and $f''$, as seen in Fig. 5. The locking-tenons $f\ f'$ are made to receive between them the head of a bolt or pin $g$ and so constructed as to prevent the upward withdrawal of the bolt, as clearly seen in Figs. 2 and 5. The pin or bolt $g$ is placed with its head between the tenons $f\ f'$, which can only be done by sliding it in from the side. The bolt is then passed through the opening or hole $c$ in the foot $a$ of the seed-tube A and locked or held in place by a nut $h$, thereby drawing the runner B up close against the foot of the seed-tube, the connection of course capable of being made very snug and holding the runner B rigid.

Attached at the sides of the foot $a$ and lower end of the seed-tube A and overlapping the tenons on the upper side of the runner B and those on the foot $a$ are plates C, which rest on the shoulders or upper side of the runner B alongside of the tenons. These plates C are provided with bolt or screw holes to conform and register with the holes $d\ d'$ of the foot $a$, through which are placed rivets or other suitable fastenings to lock the plates to the sides of the foot. At the forward lower end of these plates C, preferably at the point $k$, they are riveted or otherwise fastened together, thus clamping between them the tenon $f''$ of the runner and preventing any possible side movement of the runner.

The forward ends of the side plates C project upward and are attached to a drag-bar or draft-strap $l$ by rivets or bolts.

Our shoe is so constructed as to permit the use of side plates with straight edges, as shown in the drawings. By the use of such plates the cost of production is very much lessened and the necessity of specially-made shears obviated. In the constructions heretofore in use these plates C have been sheared with a curved edge, which curved edge could only be obtained by using specially-made shears with curved blades, adding to the expense of manufacture of the shoes. With the use of side plates of the construction shown in the drawings any ordinary shears may be used to cut the plates C. As has been stated, the portion receiving the most wear is the runner of the shoe, which is made of tempered steel.

The advantages of our construction over those heretofore in use are very apparent. By constructing a shoe with a detachable runner the expense to the user is greatly reduced and the durability of the shoe greatly enhanced.

The difficulty with the old form of shoe was the necessity, in case of repairs by reason of wear or breakage of the runner or cutting edge thereof, of removing the entire drill-shoe and replacing it by a new one, incurring much loss of time and money. With our construction these difficulties are obviated, as the runner portion of the shoe can be detached in a moment, and in case of breakage a new runner need only be obtained, which can readily and quickly be attached and put in place by the user himself by the mere use of a wrench.

We are aware that detachable runners have heretofore been made; but with such constructions it has been difficult to obtain a firm and rigid connection and to produce as strong a shoe as we are able to obtain by our improved construction. In constructions of this kind it is necessary to avoid the use of bolts passing laterally through the runner portion for attaching it to the remainder of the shoe, as the soil coming in contact with the bolts and nuts would soon work them loose, and a very unsatisfactory shoe would be the result.

Having thus described our invention, what we claim, and desire to secure by Letters Patent, is—

In a shoe for grain-drills, the combination of a seed-tube having a forwardly-extending foot and an independent runner therefor, said runner being provided with interlocking tenons with recesses in said foot to receive the same, the tenons on the runner grooved to receive the head of a bolt to lock the parts together, said tenons formed to leave a shoulder for the support of side plates, and both the foot and the runner formed to receive straight-edge side plates, substantially as and for the purpose described.

THOS. BRENNAN.
EDWARD CHRISTMAN.

Witnesses for Thos. Brennan:
  JNO. H. WARD,
  A. A. BRENNAN.
Witnesses for E. Christman:
  E. UNCLEBACH,
  R. L. MONSCH.